United States Patent [19]

Wolf et al.

[11] Patent Number: 5,247,002
[45] Date of Patent: Sep. 21, 1993

[54] POLYPHENYLENE SULPHIDE COMPOSITION CONTAINING SILVER NITRATE

[75] Inventors: Udo Wolf; Eckhard Wendt; Burkhard Köhler; Bahman Sarabi, all of Krefeld, Fed. Rep. of Germany

[73] Assignee: Bayer Aktiengesellschaft, Leverkusen-Bayerwerk, Fed. Rep. of Germany

[21] Appl. No.: 945,380

[22] Filed: Sep. 16, 1992

[30] Foreign Application Priority Data

Sep. 26, 1991 [DE] Fed. Rep. of Germany ....... 4132038

[51] Int. Cl.$^5$ ............................................. C08L 81/04
[52] U.S. Cl. ................................. 524/403; 524/609; 528/388
[58] Field of Search ................. 524/403, 609; 528/388

[56] References Cited

U.S. PATENT DOCUMENTS 3,210,321 10/1965 Doyle et al. ........................ 524/403

Primary Examiner—Harold D. Anderson
Attorney, Agent, or Firm—Connolly & Hutz

[57] ABSTRACT

This is invention relates to thermoplastic compositions of polyphenylene sulphide with an addition of silver nitrate which have improved crystallization properties and to a process for their preparation.

2 Claims, No Drawings

POLYPHENYLENE SULPHIDE COMPOSITION CONTAINING SILVER NITRATE

This invention relates to rapidly crystallizing thermoplastic compositions of polyphenylene sulphides and silver nitrate.

Polyphenylene sulphides may be used as raw materials for the production of fibres, films and moulded articles. Owing to their partially crystalline structure they have excellent properties, e.g. high wear resistance, high long-term creep strength and high dimensional accuracy. They are therefore very suitable for the production of parts which are subjected to severe mechanical and thermal conditions in use.

An additional improvement in the mechanical properties may be achieved, for example, by the incorporation of reinforcing materials such as glass fibres.

The production of moulded articles from polyphenylene sulphide by injection moulding is, however, difficult because it requires high moulding temperatures (>130° C.) and relatively long moulding times. Mould temperatures >130° C. or more cannot be employed in most injection moulding processes because the moulds are normally only designed for a temperature in the region of 100° C. (heating agent water). Mould devices operated with other heating agents, e.g. oil, and reaching temperatures >110° C. are rare and inconvenient to use. Moreover, they frequently do not reach the required temperatures and the distribution of temperature is uneven. On account of these disadvantages it may be uneconomical to employ such high mould temperatures for injection moulding.

Further, it is desirable to obtain a high crystallinity as rapidly as possible in order to obtain optimum properties. High crystallinity also ensures hardness, dimensional stability and stability of form at elevated temperatures, and the residence time in the mould determines the length of the injection cycle and hence the economical efficiency of the process.

These cycles for processing polyphenylene sulphide are relatively long, even at high mould temperatures, and the forward movement of the polyphenylene sulphide therefore becomes difficult in the production of injection moulded articles.

It has now been found that polyphenylene sulphides crystallize more rapidly if they contain from 0.01 to 2% by weight of silver nitrate, based on the polyphenylene sulphide. This enables the degree of crystallinity required for high dimensional stability to be obtained more rapidly so that the polyphenylene sulphide compositions can be processed within shorter injection moulding cycles.

The invention relates to rapidly crystallizing thermoplastic compositions consisting of a) from 98 to 99.9% by weight, preferably from 99.5 to 99.98% by weight, of a polyphenylene sulphide having a melt viscosity of at least 5 Pas, preferably at least 50 to 1200 Pas (determined at 306° C. and a shearing stress of $10^3$ Pa) and b) from 2 to 0.01% by weight, preferably from 0.5 to 0.02% by weight of silver nitrate, based on a) and b).

The present invention further relates to a process for the preparation of rapidly crystallizing thermoplastic compositions, characterised in that from 98 to 99.9% by weight, preferably from 99.5 to 99.98% by weight, of a polyphenylene sulphide having a melt viscosity of at least 5 Pas, preferably at least 50 to 1200 Pas (306° C., $10^3$ Pa) and from 2 to 0.01% by weight, preferably from 0.5 to 0.02% by weight of silver nitrate are mixed by adding the silver nitrate to the polyphenylene sulphide melt and homogenizing it in the melt.

The polyphenylene sulphide compositions according to the invention are thermoplastically processible and may be used for injection moulding.

Polyarylene sulphides may be prepared in solution from dihalogenated aromatic compounds and alkali metal sulphides in known manner (e.g. U.S. Pat. No. 2,513,188).

Silver nitrate ($AgNO_3$) and processes for their preparation are known, e.g. from Römpps Chemie-Lexikon.

The mixture of polyphenylene sulphides and silver nitrate may be prepared in ordinary commercial mixing apparatus such as kneaders or single-shaft or double-shaft extruders. The mixture obtained may be granulated for further processing when the melt has solidified.

The polyphenylene sulphide compositions may also contain fillers and/or reinforcing materials in the form of powders, fibres or webs. Examples include metals such as steel, copper or aluminium or carbon. Quartz, talc and kaolin are preferred fillers and glass fibres are preferred reinforcing materials.

The compositions may also contain inorganic pigments such as $TiO_2$, $ZnS$, phthalocyanines, carbon black, Cd pigments, spinels or organic dyes, flow improvers, mould release agents, UV absorbents and/or stabilizers.

The products may also contain conventional flame retarding additives for a further increase in their flame resistance, e.g. additives containing halogen, phosphorus or phosphorus-nitrogen, optionally in combination with oxides of the elements of the 5th sub-Group, e.g. antimony oxide.

The speed of crystallisation of the polyphenylene sulphide compositions may be further increased by the addition of inorganic or organic nucleating agents. This is standard practice for injection moulding compositions.

The quantities used amount to 0.05 to 5% by weight, preferably from 0.1 to 1% by weight. Microtalc is a preferred nucleating agent.

The polyphenylene sulphide compositions according to the invention were prepared by, for example, mixing and homogenizing PPS granulate and silver nitrate in a measuring kneader. In this process, the material is heated to 290° C. and mixed for 10 minutes.

The speed of crystallization of compositions obtained by these means was determined by known calorimetric processes (DSC measurement) by heating the samples to 380° C., maintaining this temperature for 10 minutes and then rapidly cooling the samples to the crystallization temperature of 240° C.. The isothermal half period of crystallization was used as measure of the speed of crystallization. In one of the phenylene sulphide compositions according to the invention containing 0.2% by weight of $AgNO_3$, this half period was 0.9 minutes and in a similar composition containing 0.02% of $AgNO_3$ it was also 0.9 minutes. A sample identical except for the addition of silver nitrate and subjected to the same process steps had a half period of isothermal crystallization of 4 minutes at 240° C..

Further, a polyphenylene sulphide composition according to the invention containing 0.2% of $AgNO_3$ and mixed with glass fibres and a small quantity of a wax additive had a higher softening temperature than an otherwise identical comparison sample without silver nitrate and a comparison sample in which the silver nitrate had been replaced by 3% by weight of micro talc.

We claim:

1. A rapidly crystallizing thermoplastic composition comprising:
   a) from 98 to 99.99% by weight of a polyphenylene sulfide having a melt viscosity of at least 5 Pascal seconds, determined at 360° C. and a shearing stress of $10^3$ Pascal, and
   b) from 0.01 to 2% by weight, based on a) and b), of silver nitrate.

2. A process for preparing the composition as claimed in claim 1, comprising mixing the polyphenylene sulfide a) and the silver nitrate b) by adding the silver nitrate to the polyphenylene sulfide in the melt and homogenizing in the melt.

* * * * *